US012327418B2

(12) United States Patent
Hannah et al.

(10) Patent No.: US 12,327,418 B2
(45) Date of Patent: Jun. 10, 2025

(54) OVEN APPLIANCES AND METHODS OF AUTOMATIC REVERSE SEAR COOKING

(71) Applicant: Haier US Appliance Solutions, Inc., Wilmington, DE (US)

(72) Inventors: Sabrina Marie Hannah, Louisville, KY (US); Amelia Lear Hensley, Louisville, KY (US); Katie Hawboldt Lacy, Prospect, KY (US); Gina Lucas, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 171 days.

(21) Appl. No.: 17/830,653

(22) Filed: Jun. 2, 2022

(65) Prior Publication Data

US 2023/0389578 A1 Dec. 7, 2023

(51) Int. Cl.
*F24C 3/00* (2006.01)
*F24C 3/12* (2006.01)
*F24C 7/00* (2006.01)
*F24C 7/08* (2006.01)
*G06V 20/68* (2022.01)

(52) U.S. Cl.
CPC .............. *G06V 20/68* (2022.01); *F24C 3/124* (2013.01); *F24C 7/088* (2013.01); *F24C 3/122* (2013.01); *F24C 3/126* (2013.01); *F24C 7/087* (2013.01)

(58) Field of Classification Search
CPC .......... F24C 3/124; F24C 3/126; F24C 3/122; F24C 7/087; F24C 7/088
USPC .......................................... 99/331, 333, 468
See application file for complete search history.

(56) References Cited

U.S. PATENT DOCUMENTS

| 4,301,509 | A | * | 11/1981 | Haase | ..................... F24C 7/006 219/494 |
|---|---|---|---|---|---|
| 10,517,427 | B2 | | 12/2019 | Hackley | |
| 10,584,881 | B2 | | 3/2020 | Murphy et al. | |
| 10,670,470 | B2 | | 6/2020 | Nivala et al. | |
| 10,782,027 | B2 | | 9/2020 | Bruin-Slot et al. | |
| 11,767,983 | B2 | * | 9/2023 | Clayton | ................ F24C 15/006 99/331 |
| 2013/0269539 | A1 | | 10/2013 | Polt | |
| 2016/0220059 | A1 | | 8/2016 | Wachtler et al. | |

(Continued)

FOREIGN PATENT DOCUMENTS

EP 3441677 A1 2/2019

*Primary Examiner* — Reginald Alexander
(74) *Attorney, Agent, or Firm* — Dority & Manning, P.A.

(57) ABSTRACT

An oven appliance may include a cabinet, a plurality of chamber walls, a heating element, and a controller. The plurality of chamber walls may be mounted within the cabinet. The plurality of chamber walls may define a cooking chamber. The heating element may be mounted within the cooking chamber. The controller may be in operable communication with the heating element. The controller may be configured to initiate a cooking operation that includes receiving a user selection signal indicating an automatic cooking cycle a food item receivable within the cooking chamber, directing the heating element according to a first slow-cook stage, detecting a first threshold condition of the food item within the cooking chamber during the first slow-cook stage, the first threshold condition corresponding to the user selection signal, and directing the heating element according to a second sear stage in response to detecting the first threshold condition.

8 Claims, 5 Drawing Sheets

(56) References Cited

U.S. PATENT DOCUMENTS

| | | | |
|---|---|---|---|
| 2019/0327795 A1* | 10/2019 | Hannah | F24C 7/088 |
| 2021/0123601 A1* | 4/2021 | Martin | F24B 5/087 |
| 2023/0309741 A1* | 10/2023 | Patton | F24C 7/087 |
| | | | 99/326 |
| 2023/0359153 A1* | 11/2023 | Bentley | F24C 7/087 |
| 2023/0375182 A1* | 11/2023 | Ehrenbeck | H05B 6/6458 |

* cited by examiner

OVEN APPLIANCES AND METHODS OF AUTOMATIC REVERSE SEAR COOKING

FIELD OF THE INVENTION

The present subject matter relates generally to oven appliances, and more particularly, to methods of operating an oven appliance for automatic cooking.

BACKGROUND OF THE INVENTION

Conventional residential and commercial oven appliances generally include a cabinet that includes a cooking chamber for receipt of food items for cooking. Multiple gas or electric heating elements are positioned within the cabinet for heating the cooking chamber to cook food items located therein. The heating elements can include, for example, a bake heating assembly positioned at a bottom of the cooking chamber and a separate broiler heating assembly positioned at a top of the cooking chamber.

Typically, oven appliances permit a user to select a generic cooking cycle (e.g., bake, broil, or convection cooking) to determine which heating elements are active and to what temperature the cooking chamber is heated. Such cooking cycles can cause frustration or fail to adequately cook certain food items. For instance, when cooking certain meats (e.g., steak), it may be beneficial to vary the intensity or direction of heat in order to obtain a finished food product that is seared on the outside while remaining moist on the inside. In order to achieve such results, though, significant user knowledge or intervention is required throughout the duration of the cooking process. Although attempts have been made to vary a cooking cycle within an oven appliance (e.g., by switching between two or more predetermined duty cycles or temperatures within the cooking chamber), such attempts often fail to account for the actual conditions or state of the food item being cooking. In turn, significant knowledge or intervention on the part of the user may be required to achieve a desirable finished food product. Additionally or alternatively, significant investment in additional equipment may be required, such as in the case of traditional sous vide cooking methods.

Accordingly, an appliance and method for automatically cooking a food item at a varied temperature or intensity may be desirable. More specifically, an appliance and method that can achieve consistent (e.g., desirable or selected) results of a finished food product (e.g., without direct or significant knowledge) would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an oven appliance is provided. The oven appliance may include a cabinet, a plurality of chamber walls, a heating element, and a controller. The plurality of chamber walls may be mounted within the cabinet. The plurality of chamber walls may define a cooking chamber. The heating element may be mounted within the cooking chamber. The controller may be in operable communication with the heating element. The controller may be configured to initiate a cooking operation that includes receiving a user selection signal indicating an automatic cooking cycle a food item receivable within the cooking chamber, directing the heating element according to a first slow-cook stage, detecting a first threshold condition of the food item within the cooking chamber during the first slow-cook stage, the first threshold condition corresponding to the user selection signal, and directing the heating element according to a second sear stage in response to detecting the first threshold condition.

In another exemplary aspect of the present disclosure, a method of operating an oven appliance is provided. The method may include receiving a user selection signal indicating an automatic cooking cycle for a food item receivable within a cooking chamber. The method may further include directing a heating element according to a first slow-cook stage and detecting a first threshold condition of the food item within the cooking chamber during the first slow-cook stage. The first threshold condition may correspond to the user selection signal. The method may still further include directing the heating element according to a second sear stage in response to detecting the first threshold condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
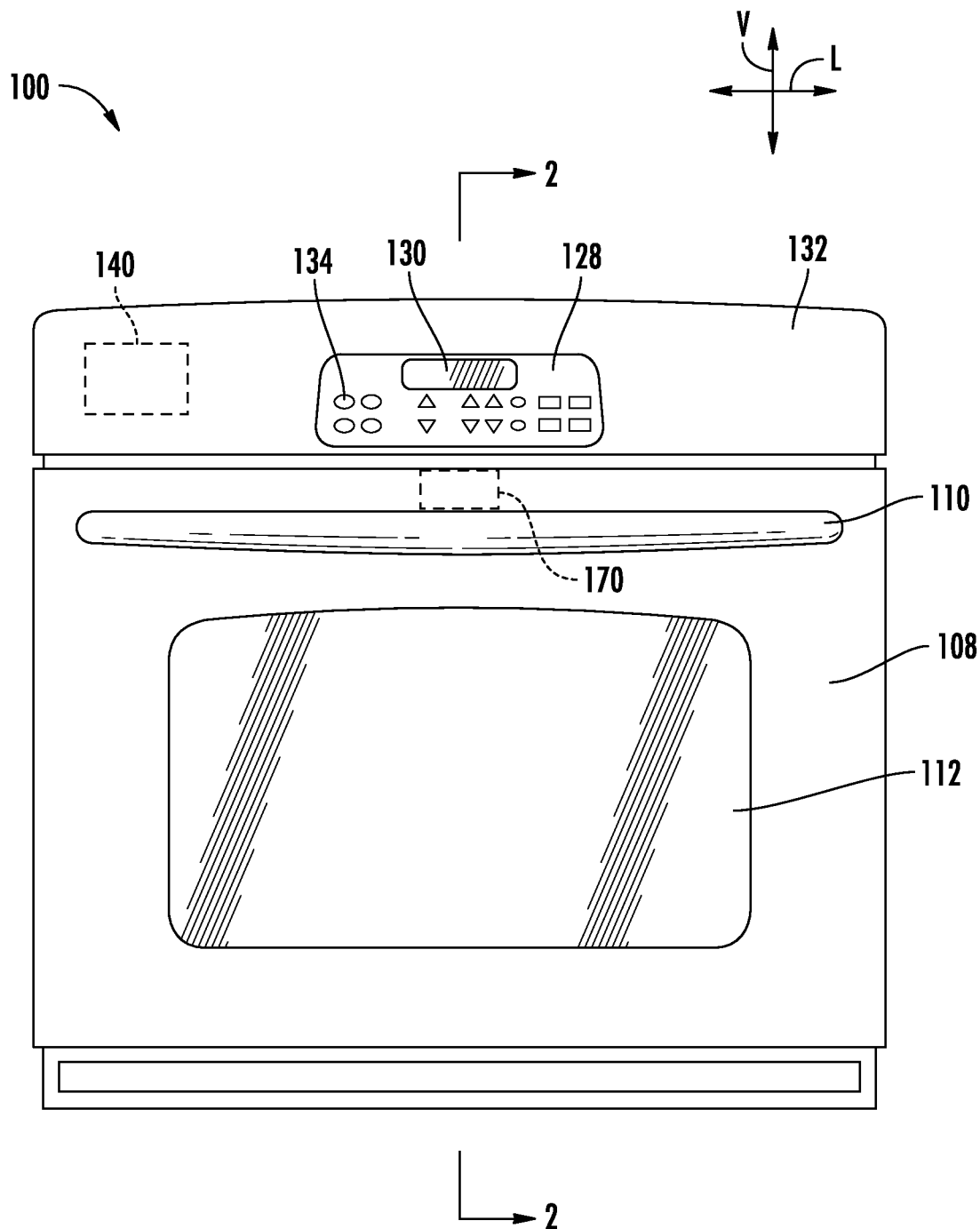
FIG. 1 provides a perspective view of an oven appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
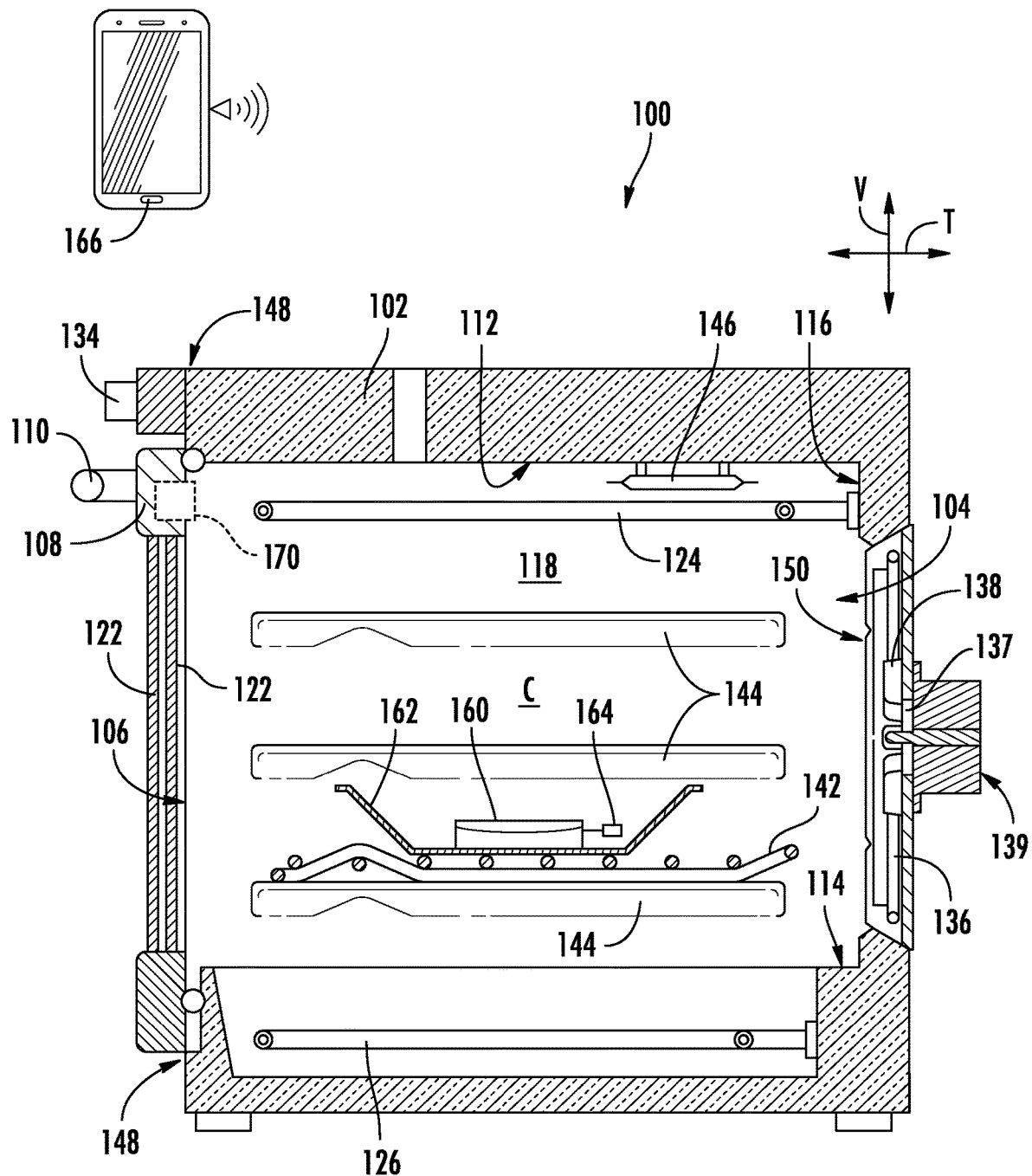
FIG. 2 provides a section view of the exemplary oven appliance of FIG. 1, taken along the line 2-2.
Figure 3:
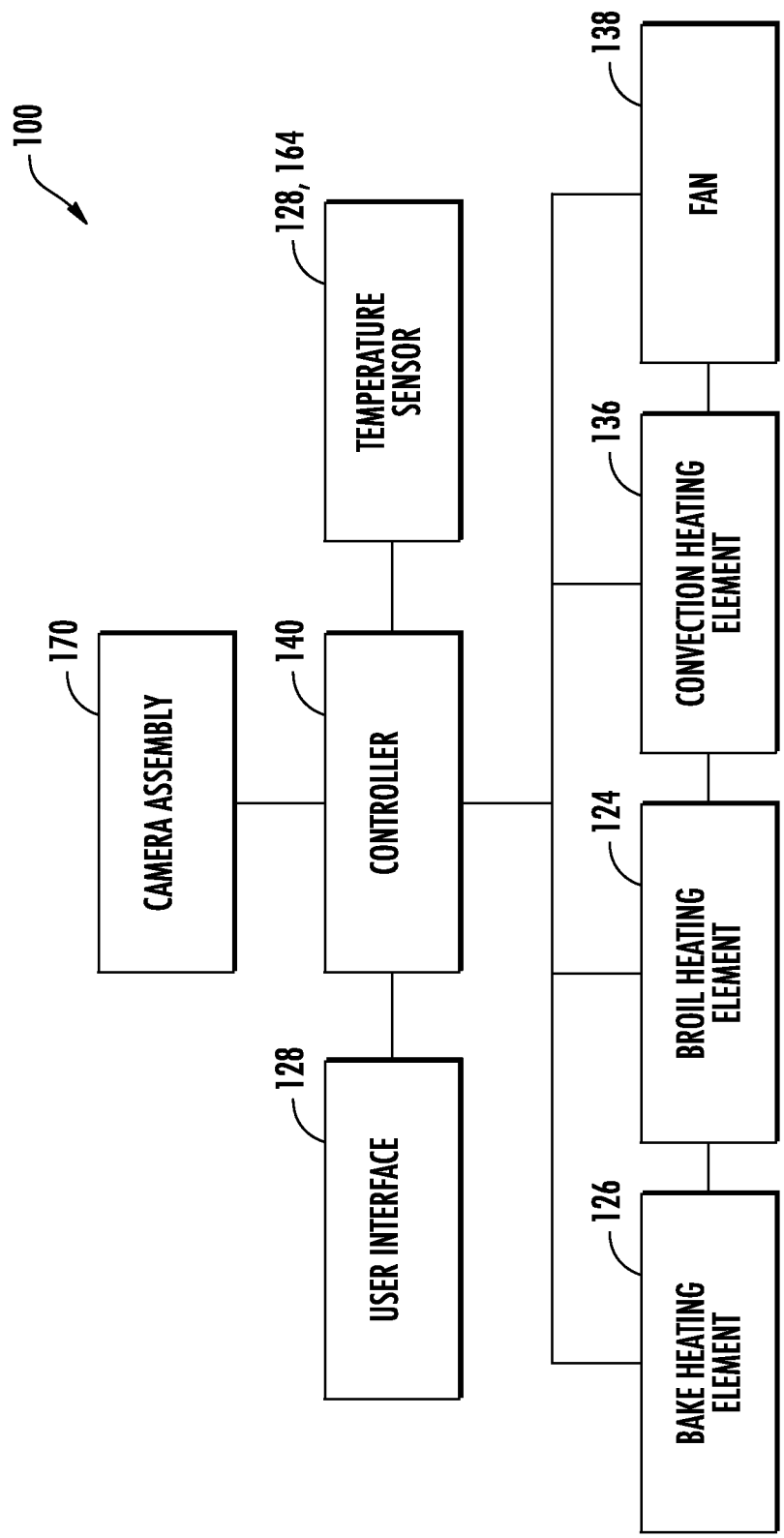
FIG. 3 provides a schematic section view of a portion of the exemplary oven appliance of FIG. 1.

Referring to FIGS. 1 through 3, in exemplary embodiments, a cooking appliance or oven appliance 100 that includes an insulated cabinet 102 with an interior cooking chamber 104 defined by a plurality of inner walls (e.g., a top wall 112, a bottom wall 114, a back wall 116, and opposing sidewalls 118, 120). Cooking chamber 104 is configured for the receipt of one or more food items to be cooked. Oven appliance 100 includes a door 108 pivotally mounted, for example, with one or more hinges (not shown), to cabinet 102 at the opening 106 of cabinet 102 to permit selective access to cooking chamber 104 through opening 106. A handle 110 is mounted to door 108 and assists a user with opening and closing door 108. For example, a user can pull on handle 110 to open or close door 108 and access cooking chamber 104.

In some embodiments, a seal (e.g., gasket) is provided between door 108 and cabinet 102 that assists with maintaining heat and cooking fumes within cooking chamber 104 when door 108 is closed, as shown in FIGS. 1 and 2. Multiple parallel glass panes 122 provide for viewing the contents of cooking chamber 104 when door 108 is closed and assist with insulating cooking chamber 104. A baking rack 142 is positioned in cooking chamber 104 for the receipt of food items (e.g., food item 160) or utensils (e.g., utensil 162) containing food items. Baking rack 142 is slidably received onto embossed ribs or sliding rails 144 such that rack 142 may be conveniently moved into and out of cooking chamber 104 when door 108 is open.

While oven 100 is shown as a wall oven, the present invention could also be used with other cooking appliances or configurations such as, for example, a double-chamber oven appliance, a stand-alone oven appliance, a combined oven-range appliance, or other configurations of such ovens.

One or more heating elements at the top, bottom, or rear of cooking chamber 104 generally provide heat to cooking chamber 104 (e.g., when activated) for cooking. Such heating element(s) can be gas, electric, microwave, or a combination thereof. For example, the heating elements 124, 126, 136 may be provided as one or more gas burner tubes, resistive or radiant electric heating elements, or microwave heating elements. In the embodiment shown in FIG. 2, oven appliance 100 includes a top heating element 124 and a bottom heating element 126, where bottom heating element 126 is positioned adjacent to and below at least a portion of bottom wall 114. Other configurations with or without wall 114 may be used as well.

In some embodiments, oven appliance 100 includes a convection heating element 136 or a convection fan 138 positioned adjacent back wall 116 of cooking chamber 104 (e.g., in fluid communication with cooking chamber 104 through a fan opening 150). Convection fan 138 is powered by a convection fan 138 motor 139. Further, convection fan 138 can be a variable speed fan. Thus, the speed (e.g., rotation speed) of fan 138 may be controlled or set anywhere between and including, for example, 0 and 100 percent. In certain embodiments, oven appliance 100 includes a bidirectional triode thyristor (not shown) [i.e., a triode for alternating current (TRIAC)] to regulate the operation of convection fan 138 such that the speed of fan 138 may be adjusted during operation of oven appliance 100 (e.g., during a preheat or cooking cycle). Optionally, speed of convection fan 138 can be determined by, and communicated to, fan 138 by controller 140. In addition, a sensor 137, such as a rotary encoder, a Hall effect sensor, or the like, may be included at the base of fan 138, for example, between fan 138 and motor 139 as shown in the exemplary embodiment of FIG. 2, to sense the speed of fan 138. The speed of fan 138 may be measured in, for example, revolutions per minute ("RPM").

As shown, oven appliance 100 includes a user interface 128. In some embodiments, user interface 128 has a display 130 positioned on an interface panel 132, as well as a variety of controls 134. Interface 128 allows the user to select various options for the operation of oven 100 including, for example, temperature, time, and various cooking or cleaning cycles. Operation of oven appliance 100 can be regulated by a controller 140 that is operatively coupled (i.e., in communication with) user interface 128, heating elements 124, 126, 136 and other suitable components of oven 100.

In certain embodiments, in response to user manipulation of the user interface 128, controller 140 can operate the heating element(s). Controller 140 can receive measurements from a chamber temperature sensor 146 (e.g., thermistor or thermocouple) mounted and configured to measure temperature within cooking chamber 104. Optionally, such temperature measurements may provide a temperature indication to the user with display 130. Separate from or in addition or the chamber temperature sensor 146, an accessory temperature sensor 164 may be provided in thermal (e.g., convective or conductive) communication with the food item to directly detect or measure the temperature of a food item 160 or utensil 162 within cooking chamber 104. For instance, accessory temperature sensor 164 may include a temperature probe movably disposed within cooking chamber 104 (e.g., to move relative to the same). A sensing element (e.g., thermistor, thermocouple, or deformable surface acoustic wave sensor; which detects changes in temperature through strain deformation induced by heat) may be coupled to the temperature probe and be in electrical or wireless communication with controller 140 to communicate temperature measurements or signals to the controller 140 based on the heat at the accessory temperature sensor 164.

In some embodiments, controller 140 includes a memory (e.g., non-transitive media) and one or more processing devices such as microprocessors, CPUs, or the like, such as general or special purpose microprocessors operable to execute programming instructions or micro-control code associated with operation of oven appliance 100. The memory may represent random access memory such as DRAM or read only memory such as ROM or FLASH. In one embodiment, the processor executes programming instructions stored in memory. The memory may be a separate component from the processor or may be included onboard within the processor.

Controller 140 may be positioned in a variety of locations throughout oven appliance 100. In the illustrated embodiment, controller 140 is located next to user interface 128 within interface panel 132. In other embodiments, controller 140 may be located under or next to the user interface 128 otherwise within interface panel 132 or at any other appropriate location with respect to oven appliance 100. In the embodiment illustrated in FIG. 1, input/output ("I/O") signals are routed between controller 140 and various operational components of oven appliance 100 such as heating elements 124, 126, 136, convection fan 138, controls 134, display 130, sensor(s) 137, 146, 164, alarms, or other components as may be provided. In one embodiment, user interface 128 may represent a general purpose I/O ("GPIO") device or functional block.

Although shown with touch type controls 134, it should be understood that controls 134 and the configuration of oven appliance 100 shown in FIG. 1 is provided by way of example only. More specifically, user interface 128 may include various input components, such as one or more of a variety of electrical, mechanical, or electro-mechanical input devices including rotary dials, push buttons, and touch pads. User interface 128 may include other display components, such as a digital or analog display device designed to provide operational feedback to a user. User interface 128 may be in communication with controller 140 via one or more signal lines or shared communication busses.

Optional embodiments may include an auxiliary user interface or control device 166 in operable communication with controller 140. Auxiliary control device 166 may be embodied as a discrete processing unit, such as a smart phone, tablet, or laptop computer positioned apart from the cabinet 102. In some embodiments, auxiliary control device 166 is in wireless communication with controller 140. Both controller 140 and auxiliary control device 166 may share a layer protocol architecture, that is adapted for short-wavelength ultra-high frequency (UHF) communications in a band between 2.4 GHz and 2.485 GHz (e.g., according to the IEEE 802.15.1 standard). During operations, auxiliary control device 166 may receive or transmit data signals from controller 140 to affect and display information about the operations of the appliance 100.

In certain embodiments, one or more camera assemblies 170 are mounted on or within appliance 100 to capture images (e.g., static images or dynamic video) of a portion of cooking chamber 104, such as at to capture images of utensil 162 or food item 160 within cooking chamber 104. Generally, camera assembly 170 may be mounted to cabinet 102 (e.g., directly on an inner wall or, alternatively, indirectly, such as on door 108) and directed at cooking chamber 104. Moreover, camera assembly 170 may be any type of device suitable for capturing a picture or video. As an example, camera assembly 170 may be a video camera or a digital camera with an electronic image sensor [e.g., a charge coupled device (CCD) or a CMOS sensor]. Camera assembly 170 may generally be provided in operable communication with controller 140 such that controller 140 may receive an image signal (e.g., video signal) from camera assembly 170 corresponding to the picture(s) captured by camera assembly 170. Once received by controller 140, the image signal (e.g., video signal) may be further processed or analyzed at controller 140 (e.g., to detect one or more conditions of food item 160) or transmitted to a separate device.

Figure 4:
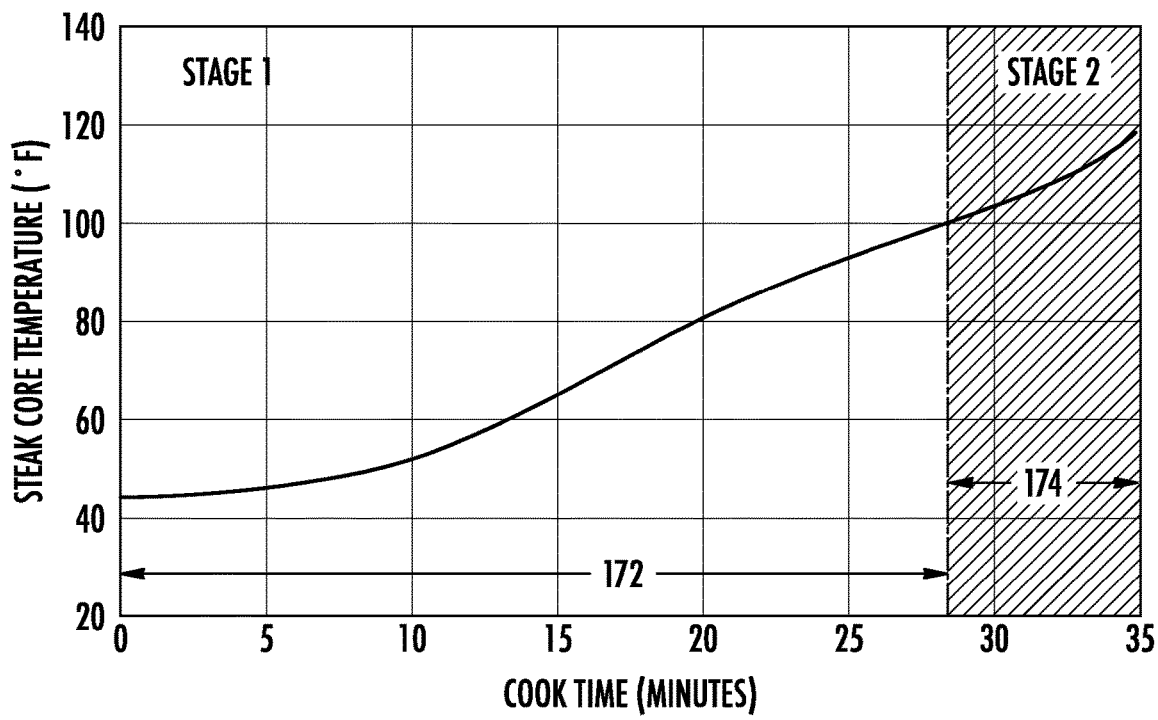
FIG. 4 is a graph view illustrating temperature over time for a food item within an oven appliance during an automatic cooking operation according to exemplary embodiments of the present disclosure.
Figure 5:
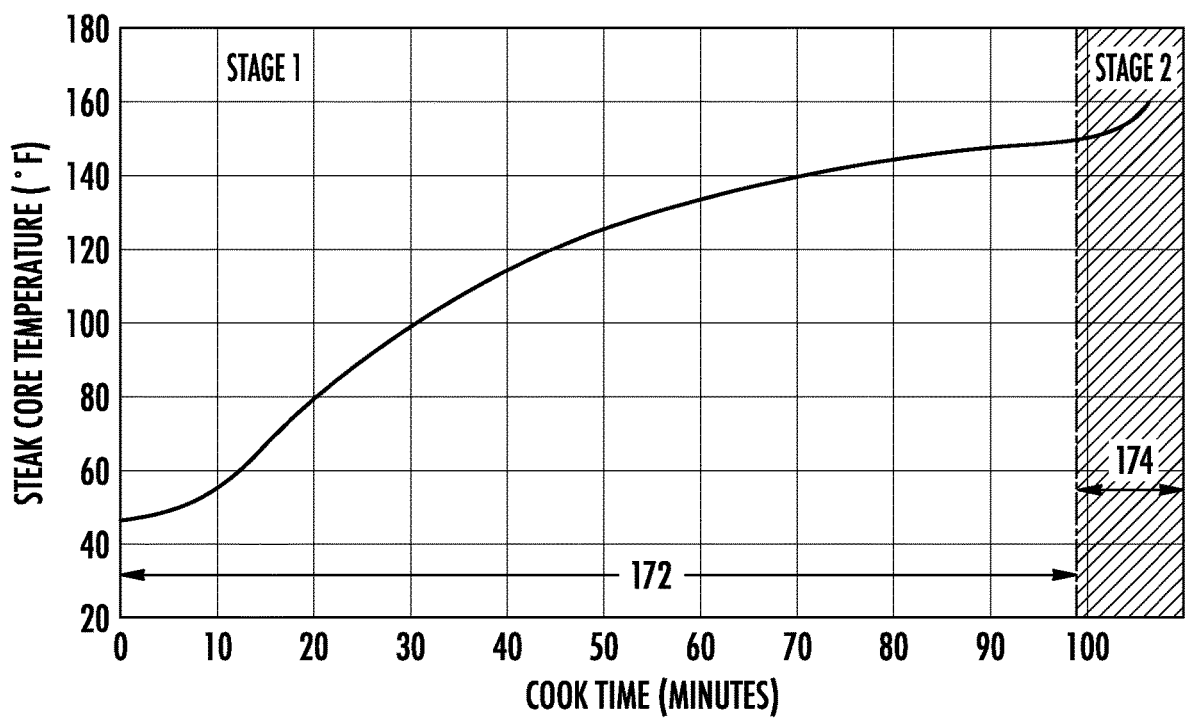
FIG. 5 is a graph view illustrating temperature over time for a food item within an oven appliance during an automatic cooking operation according to exemplary embodiments of the present disclosure.

Turning now generally to FIGS. 3 through 5, controller 140 may be configured to direct an automatic cooking operation executed without direct user input (e.g., beyond an initial selection input or prompt to start by the user). For instance, a user may specify a desired doneness (e.g., a specific internal temperature of the food item 160 or general level, such as blue, rare, medium rare, medium, medium well, or well done) for a food item 160 (e.g., a meat, such as steak). FIGS. 4 and 5, in particular, illustrate the measured internal temperature (e.g., detected at accessory temperature sensor 164) over time across two discrete stages for a specified doneness level of medium rare (FIG. 4) and well done (FIG. 5). Generally, the measured time (i.e., "cook time") of FIGS. 4 and 5 begins after a food item 160 has been inserted into the cooking chamber 104 (e.g., as prompted by a user input at the user interface 128 or 166 or establishment of a connection between the controller 140 and accessory temperature sensor 164). Thus, the illustrated "cook time" may follow a preheat cycle in which one or more heating elements 124, 126, 136 are activated, as would be understood.

As shown, the automatic cooking operation or cycle may generally include at least two discrete stages (e.g., following a preheat stage or cycle) that are based on or dictated, at least in part, by a desired doneness (e.g., supplied by a user selection signal received from the user interface 128 or 166). In particular, the automatic cooking operation may include a first slow-cook stage 172 and a second sear stage 174 that follows the first slow-cook stage 172. Thus, and as will be described in greater detail below, the automatic cooking operation may generally be described as an automatic reverse-sear cooking operation. Advantageously, the described operation(s) may facilitate consistent (e.g., desirable or selected) results of a finished food product without requiring significant cooking knowledge by a user (e.g., outside of the desired doneness) or direct user intervention (e.g., after inserting uncooked food into the cooking chamber 104 or prompting the cooking operation to start).

In some embodiments, the first slow-cook stage 172 directs one or more of the heating elements 124, 126, 136 within cabinet 102 to slowly heat an uncooked food item 160. Specifically, one or more of the heating elements 124, 126, 136 may be directed to a first power output setting out of a maximum output (e.g., as dictated by a duty cycle or TRIAC). The first power output setting of one or more of the heating elements 124, 126, 136 may be less than 100% (e.g., a duty cycle or TRIAC setting that is less than 100%).

As an example, the bottom heating element 126 may be activated according to a first power output setting that is less than 100%. In certain embodiments, the first power output setting of the bottom heating element 126 is less than or equal to 80% (e.g., between 50% and 80% or between 70% and 80%). Optionally, the first power output setting of the bottom heating element 126 may be maintained for the duration of the first slow-cook stage 172. The first power-output setting of the bottom heating element 126 may be based on the desired doneness (e.g., as indicated by the user selection signal) or, alternatively, fixed as independent from the user selection signal.

As an additional or alternative example, the top heating element 124 may be activated according to a first power output setting that is less than 100%. In certain embodiments, the first power output setting of the top heating element 124 is less than or equal to 50% (e.g., between 10% and 50% or between 10% and 20%). Optionally, the first power output setting of the top heating element 124 may be maintained for the duration of the first slow-cook stage 172. The first power-output setting of the top heating element 124 may be based on the desired doneness (e.g., as indicated by the user selection signal) or, alternatively, fixed as independent from the user selection signal. Although certain embodiments may provide a first power output setting of the top heating element 124, alternative embodiments may hold the top heating element 124 at an inactive state (e.g., for the duration of the first slow-cook stage 172).

During the first slow-cook stage 172, the appliance 100 may monitor or measure one or more conditions of the food item 160. Such conditions may include internal temperature (e.g., as detected at the accessory temperature sensor 164), temperature of cooking chamber 104, or color of the food item 160 (e.g., as detected at the camera assembly 170). In some embodiments, at least one threshold condition of the food item 160 may be predetermined (e.g., based on the user selection signal). In the exemplary embodiments of FIGS. 4 and 5, the threshold condition is provided as an internal temperature value (e.g., 100° Fahrenheit for Medium Rare and 150° Fahrenheit for Well Done). Detection of the first threshold condition may prompt transition to the second sear stage 174. Additionally or alternatively, a user may be prompted to remove accessory temperature sensor 164 (e.g., by a message, icon, or sound at a user interface 128 or 166).

In contrast to the first slow-cook stage 172, the second sear stage 174 may provide heat that is more direct or otherwise less diffuse. In some embodiments, the second sear stage 174 directs one or more of the heating elements 124, 126, 136 within cabinet 102 to quickly heat a partially cooked food item 160. Specifically, one or more of the heating elements 124, 126, 136 may be directed to a second power output setting out of a maximum output (e.g., as dictated by a duty cycle or TRIAC). The second power output setting of one or more of the heating elements 124, 126, 136 may be higher than the first power output setting, such as 100% (e.g., a duty cycle or TRIAC setting that is equal to the maximum output).

As an example, the top heating element 124 may be activated according to a second power output setting that is greater than 50%. In certain embodiments, the second power output setting of the top heating element 124 is greater than 80% (e.g., between 80% and 100% or approximately 100%). Optionally, the second power output setting of the top heating element 124 may be maintained for the duration of the second sear stage 174. The second power-output setting of the top heating element 124 may be based on the desired doneness (e.g., as indicated by the user selection signal) or, alternatively, fixed as independent from the user selection signal.

In some embodiments, the bottom heating element 126 is held in an inactive state. For instance, the bottom heating element 126 may be held inactive for the duration of the second sear stage 174. Thus, heat during the second sear stage 174 may be primarily focused and unmitigated (e.g., by a solid surface at utensil 162, which may absorb or distribute heat from the bottom heating element 126).

In optional embodiments, one or more air handlers (e.g., convection fan 138) is activated during the second sear stage 174 (e.g., for the duration thereof). For instance, the convection fan 138 may be activated according to a second-stage speed or power setting that is greater than 50% (e.g., relative to a maximum rotation speed or power setting to the convection fan 138). In certain embodiments, the second-stage speed or power setting of the convection fan 138 is greater than 80% (e.g., between 80% and 100% or approximately 100%). Optionally, the second-stage speed or power setting of the convection fan 138 may be maintained for the duration of the second sear stage 174. The second-stage speed or power setting of the convection fan 138 may be based on the desired doneness (e.g., as indicated by the user selection signal) or, alternatively, fixed as independent from the user selection signal.

During the second sear stage 174, the appliance 100 may monitor or measure one or more conditions (e.g., elapsed time or measured temperature). Such conditions may include the time for which the second sear stage 174 has occupied (e.g., as a countdown). In some embodiments, at least one (e.g., second) threshold condition may be predetermined, such as a maximum time period of the second stage, which may be predetermined (e.g., based on the user selection signal). In the exemplary embodiments of FIGS. 4 and 5, the second threshold condition is provided as a maximum time period (e.g., 6 minutes, 30 seconds for Medium Rare and 7 minutes, 30 seconds for Well Done). Detection of the second threshold condition may prompt an end to the second sear stage 174 (e.g., halting activation of each heating element 124, 126, 136 or otherwise directing one or more heating elements 124, 126, 136 to an inactive state).

Figure 6:
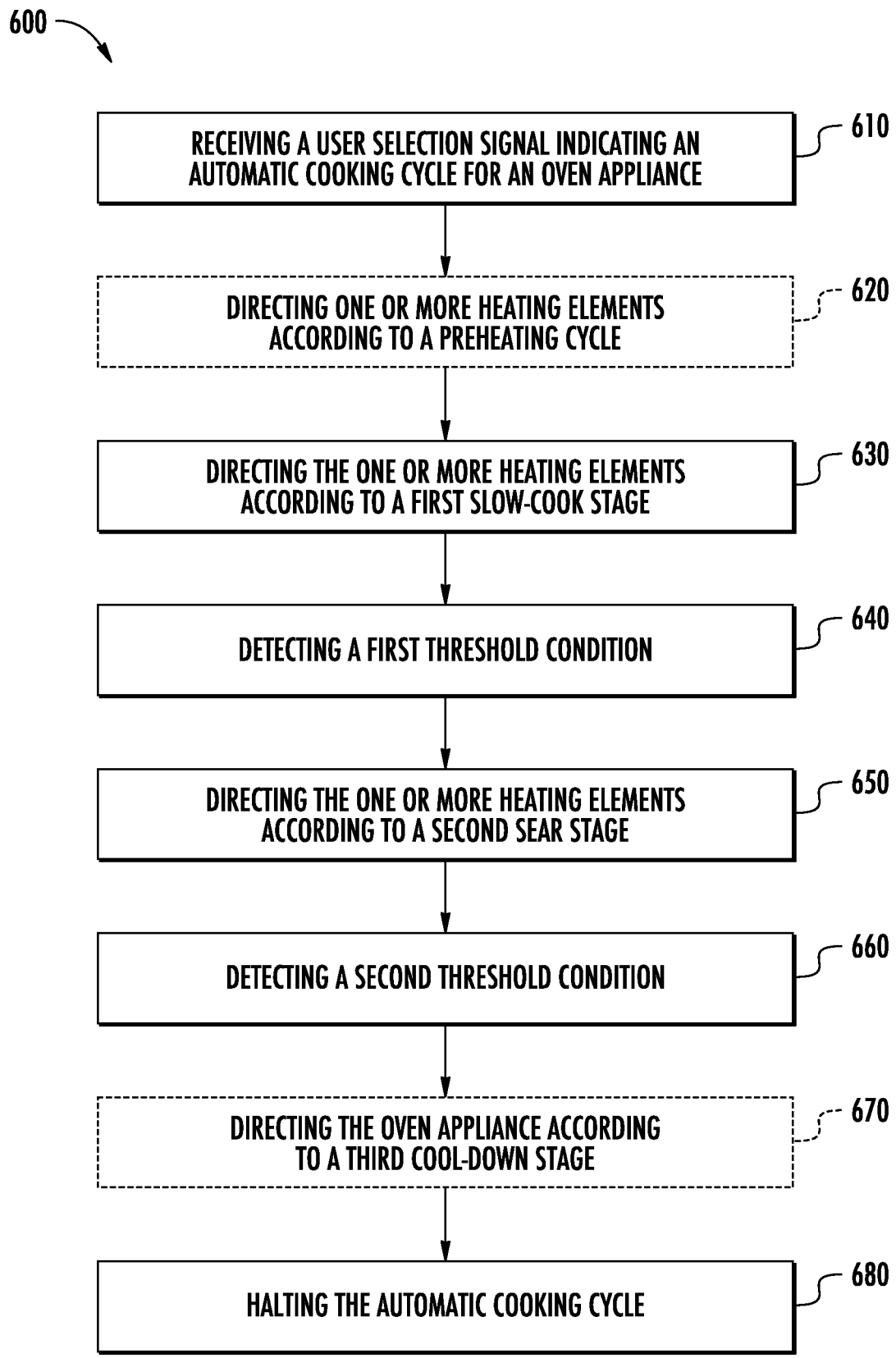
FIG. 6 provides a flow chart illustrating a method of operating an oven appliance according to example embodiments of the present disclosure.

Turning now to FIG. 6, the present disclosure may further be directed to methods (e.g., method 600) of operating an oven appliance, such as appliance 100. In exemplary embodiments, the controller 140 may be operable to perform various steps of a method in accordance with the present disclosure. The methods (e.g., 600) may occur as, or as part of, a cooking operation (e.g., automatic cooking operation) of oven appliance 100.

It is noted that the order of steps within method 600 are for illustrative purposes. Except as otherwise indicated, one or more steps in the below method 600 may be changed, rearranged, performed in a different order, or otherwise modified without deviating from the scope of the present disclosure.

At 610, the method 600 includes receiving a user selection signal. Generally, the user selection signal indicates an automatic cooking cycle. For instance, the user selection signal may be received from a user interface (e.g., mounted to cabinet or provided at auxiliary control device) in response to a user input engagement. Such user input engagement may correspond to a user selecting a particular food item (e.g., meat) or the doneness or internal temperature to which the user would like for the food item to be cooked. In some embodiments, a plurality of predetermined automatic cooking cycles may be provided (e.g., from which a user may select). Each automatic cooking cycle may differ and correspond to a unique user signal. Additionally or alternatively, the user signal (e.g., signals or instructions for the appliance) may be based on a predetermined formula using a user-specified internal temperature for the food item to achieve.

At 620, the method 600 includes, optionally, directing one or more heating elements according to a preheating cycle. For instance, as would be understood, one or more heating elements may be directed to heat the cooking chamber, such as for a predetermined preheat time period a set or predetermined temperature (e.g., as measured by an internal temperature sensor within the cooking chamber). Such a predetermined preheat time period or predetermined temperature may be based on the user selection signal. Once the predetermined preheat time period or predetermined temperature is/are measured or met, the user may be notified (e.g., via an alert at a user interface), such that the user can know to insert an uncooked food item into the cooking chamber (e.g., with an accessory temperature sensor).

At 630, the method 600 includes directing one or more heating elements according to a first slow-cook stage. For instance, one or more of the heating elements may be directed to a first power output setting out of a maximum output (e.g., as dictated by a duty cycle or TRIAC). The first power output setting of one or more of the heating elements may be less than 100% (e.g., a duty cycle or TRIAC setting that is less than 100%), as described above. Optionally, the bottom heating element and the top heating element may be directed to unique power output settings. In turn, both the bottom heating element and the top heating element may be active for the duration of the first slow-cook stage.

At 640, the method 600 includes detecting a first threshold condition (e.g., during the first slow-cook stage). The first threshold condition may be based on the user selection signal and, thus, the desired doneness of the user. In some embodiments, the first threshold condition includes measuring a food temperature that greater than or equal to a first temperature threshold at the food item. Such a food temperature may be detected on or within the food item (e.g., at the temperature sensor probe). Moreover, such a food temperature would be understood to be below the final or cooked temperature to which the food item will be brought.

In additional or alternative embodiments, the first threshold condition may include a visual indictor detected in an image of the food item within the cooking chamber. In turn, 640 may include obtaining one or more images of the food item (e.g., at the camera assembly). Although the term "image" is used herein, it should be appreciated that according to exemplary embodiments, the camera assembly may take any suitable number or sequence of two-dimensional images, videos, or other visual representations of the food item or cooking utensil on which the food item is position positioned]. For example, the one or more images may include a video feed or series of sequential static images obtained by camera assembly that may be transmitted to the controller (e.g., as a data signal) for analysis or other manipulation. These obtained images may vary in number, frequency, angle, field-of-view, resolution, detail, etc.

Subsequently, 640 may include analyzing the one or more images to identify a visual indicator of the food item. For instance, using one or more image analysis techniques, the visual indicator (e.g., color of the food item) may be measured or identified.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor the food item or utensil. It should be appreciated that this image analysis or processing may be performed locally (e.g., by controller) or remotely (e.g., by offloading image data to a remote server or network).

Specifically, the analysis of the one or more images may include implementation of an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify a change in color in the surface of the food item, the existence of a certain condition, etc. For example, one or more reference images may be obtained when a particular condition exists, and these references images may be stored for future comparison with images obtained during appliance operation. Similarities or differences between the reference image and the obtained image may be used to extract useful information for improving appliance performance.

The image processing algorithms may use other suitable techniques for recognizing or identifying items or objects, such as edge matching or detection, divide-and-conquer searching, greyscale matching, histograms of receptive field responses, or another suitable routine (e.g., executed at the controller based on one or more captured images from one or more cameras). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

In addition to the image processing techniques described above, the image analysis may include utilizing artificial intelligence ("AI"), such as a machine learning image recognition process, a neural network classification module, any other suitable artificial intelligence (AI) technique, or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

In further additional or alternative embodiments, 640 may thus include measuring elapsed time of the first slow-cook stage greater than or equal to the maximum time period. Thus, upon initiation of 630, the passage of time may be measured (e.g., until it is determined that the maximum time period of the first slow-cook stage has been reached).

At 650, the method 600 includes directing the one or more heating elements according to a second sear stage (e.g., in response to 640). For instance, one or more of the heating elements may be directed to a second power output setting out of a maximum output (e.g., as dictated by a duty cycle or TRIAC). The second power output setting of one or more of the heating elements (e.g., the top heating element) may be greater than 50% (e.g., a duty cycle or TRIAC setting that is greater than 50%), as described above. Optionally, the bottom heating element be held in an inactive stage for the duration of the second sear stage. Additional or alternatively, and as further described above, the convection fan may be activated for at least a portion of the second sear stage (e.g., at a rotation speed or power setting corresponding to the user selection signal or second sear stage, generally).

At 660, the method 600 includes detecting a second threshold condition. As described above, the second threshold condition may be set or predetermined as a time period or temperature. In some such embodiments, 660 may thus include measuring elapsed time of the second sear stage greater than or equal to the maximum time period. Thus, upon initiation of 650, the passage of time may be measured (e.g., until it is determined that the maximum time period of the second sear stage has been reached).

At 670, the method 600 includes, optionally, directing the oven appliance according to a third cool-down stage (e.g., in response to 660). In some embodiments, 670 includes halting activation of the heating elements (i.e., directing each of the heating elements to an inactive state). Thus, heat generation within the cooking chamber may be stopped. Additionally or alternatively, an alert signal may be transmitted (e.g., to a user interface) in response to 660. Such an alert signal may generate a message, icon, or sound at a user interface, such as to notify or instruct a user to remove the food item from the cooking chamber. Further additionally or alternatively, a cool-down timer may be activated to measure a predetermined cool down period, the completion of which may prompt transmission of a corresponding alert signal.

At 680, the method 600 includes halting the automatic cooking cycle (e.g., following 670 or in response to 660). In some embodiments, 680 includes halting activation of the heating elements (i.e., directing each of the heating elements to an inactive state if such heating elements have not yet been deactivated). Additionally or alternatively, an alert signal may be transmitted (e.g., to a user interface) in response to 660. Such an alert signal may generate a message, icon, or sound at a user interface, such as to notify the user that the automatic cooking cycle is complete.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance comprising:
   a cabinet;
   a plurality of chamber walls mounted within the cabinet, the plurality of chamber walls defining a cooking chamber;
   a heating element mounted within the cooking chamber; and
   a controller in operable communication with the heating element, the controller being configured to initiate a cooking operation comprising
      receiving a user selection signal indicating an automatic cooking cycle for a food item receivable within the cooking chamber,
      directing the heating element according to a first slow-cook stage,
      detecting a first threshold condition of the food item within the cooking chamber during the first slow-cook stage, the first threshold condition corresponding to the user selection signal,
      directing the heating element according to a second sear stage in response to detecting the first threshold condition, and
      detecting a second threshold condition during the second sear stage,
      wherein the second threshold condition is a maximum time period of the second sear stage, and
      wherein detecting the second threshold condition comprises measuring elapsed time of the second sear stage greater than or equal to the maximum time period.

2. The oven appliance of claim 1, further comprising a temperature sensor in thermal communication with the food item, wherein detecting the first threshold condition comprises measuring a food temperature greater than or equal to a first temperature threshold at the food item.

3. The oven appliance of claim 1, further comprising a camera assembly directed at the cooking chamber, wherein detecting the first threshold condition comprises
   obtaining an image of the food item, and
   analyzing the image to identify a visual indicator of the food item.

4. The oven appliance of claim 1, wherein the heating element is a top heating element disposed above the food item, wherein the oven appliance further comprises a bottom heating element disposed below the food item, and wherein directing the heating element according to the second sear stage comprises holding the bottom heating element in an inactive state for a duration of the second sear stage.

5. The oven appliance of claim 1, wherein the cooking operation further comprises halting activation of the heating element in response to detecting the second threshold condition.

6. The oven appliance of claim 1, wherein the cooking operation further comprises transmitting an alert signal in response to detecting the second threshold condition.

7. The oven appliance of claim 1, further comprising a temperature sensor in thermal communication with the food item, wherein detecting the first threshold condition comprises measuring a food temperature greater than or equal to a first temperature threshold at the food item.

8. The oven appliance of claim 1, wherein the first threshold condition is a maximum time period of the first slow-cook stage, and wherein detecting the first threshold condition comprises measuring elapsed time of the first slow-cook stage greater than or equal to the maximum time period.

* * * * *